Figure 1:
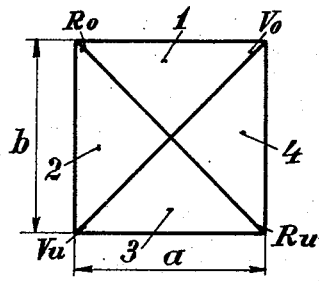

Feb. 22, 1927. 1,618,836
L. KÜRTÖSSY
AUTOMATIC COUPLING FOR RAILWAY VEHICLES
Filed March 12, 1925   5 Sheets-Sheet 1

Inventor
L. Kürtössy

Feb. 22, 1927. 1,618,836
L. KÜRTÖSSY
AUTOMATIC COUPLING FOR RAILWAY VEHICLES
Filed March 12, 1925    5 Sheets-Sheet 3

Inventor
L. Kürtössy
By Marks & Clerk

Feb. 22, 1927. 1,618,836
L. KÜRTÖSSY
AUTOMATIC COUPLING FOR RAILWAY VEHICLES
Filed March 12, 1925  5 Sheets-Sheet 4

Inventor
L. Kürtössy
By Marks & Clerk
Attys.

Patented Feb. 22, 1927.

1,618,836

UNITED STATES PATENT OFFICE.

LÁSZLÓ KÜRTÖSSY, OF BUDAPEST, HUNGARY.

AUTOMATIC COUPLING FOR RAILWAY VEHICLES.

Application filed March 12, 1925, Serial No. 15,011, and in Hungary March 24, 1924.

This invention relates to central buffer couplings for railway vehicles, in which the guiding surfaces of the coupling head also take up the buffer forces and are so arranged that they guide the heads into a predetermined extreme position each time they are pushed together.

Several kinds of couplings have already been proposed all of which, however, have certain disadvantages. The circumstance that the coupling members must work smoothly even after the vehicles have been turned, necessitates the head being relatively wide, when the guiding surfaces are arranged in the ordinary manner. This applies more particularly to coupling heads, in which at one side of the longitudinal central plane there is on one of the coupling heads a projection bounded by inclined guiding surfaces and at the other side of the said plane and in the other coupling head a recess for receiving the said projection. In such coupling heads the horizontal difference, which in the most favourable case can still be equalized, in each head amounts to one-third of the width of the coupling head in each lateral direction and therefore the total horizontal difference that the head is capable of taking up to two-thirds of the total width of the head.

Another group of coupling heads of a known type comprises constructions, in which diametrically opposite projections are provided on the head for the purpose of vertical and horizontal compensation. Such arrangements are generally speaking suitable for compensating vertical and horizontal differences, the amount of which as compared with the dimensions of the head is greater than in the heads previously referred to. As however in the latter the guiding surfaces reach at most to the middle of the head, the projections are unsupported, when the heads are closed, and in consequence the guiding surfaces do not transmit any buffer forces.

In the coupling head forming the subject of the present invention these drawbacks are overcome. According to the invention each projection of the head is formed by two guiding surfaces, one guiding surface extending through the whole breadth of the head and inclined to the vertical central longitudinal plane, the other guiding surface extending through the whole height of the coupling head and inclined to the horizontal central longitudinal plane, so that between the projections two diametrically opposite recesses are formed. This arrangement of the surfaces ensures on the one hand, that the head is capable of taking up differences in the vertical and horizontal direction equal to its dimensions, and on the other hand, owing to the surfaces which guide in the horizontal direction extending right across the head and being so inclined to the vertical central plane that in the plan view of the head they intersect in the longitudinal axis of the latter, that after sliding into engagement with one another the heads without the help of any other member rest against each other snugly and the guiding surfaces transmit the buffer forces over their whole extent.

Figure 2:
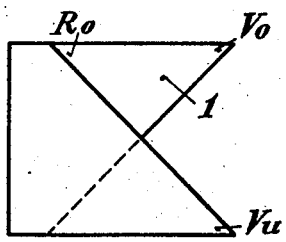
Figure 4:
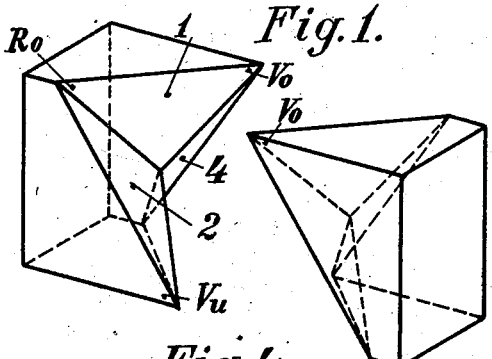
Figure 3:
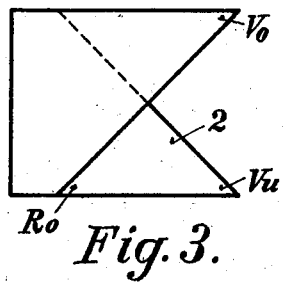
Figure 5:
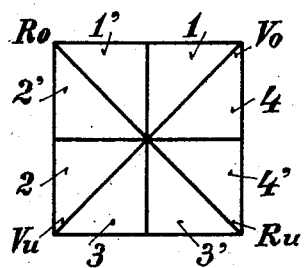
Figure 6:
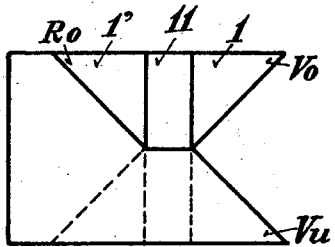
Figure 8:
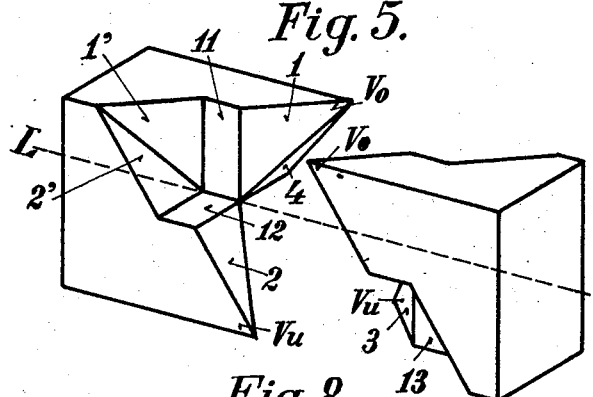
Figure 7:
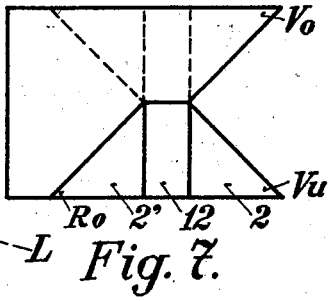
Figure 17:
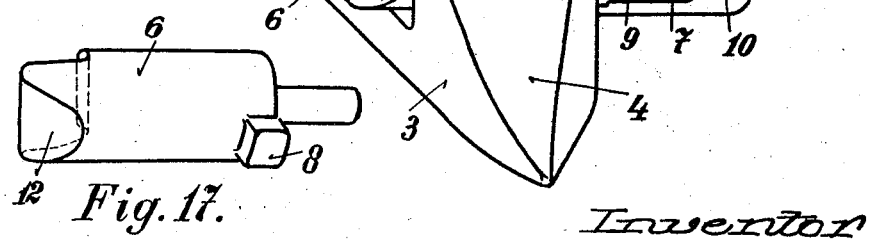
Figure 18:
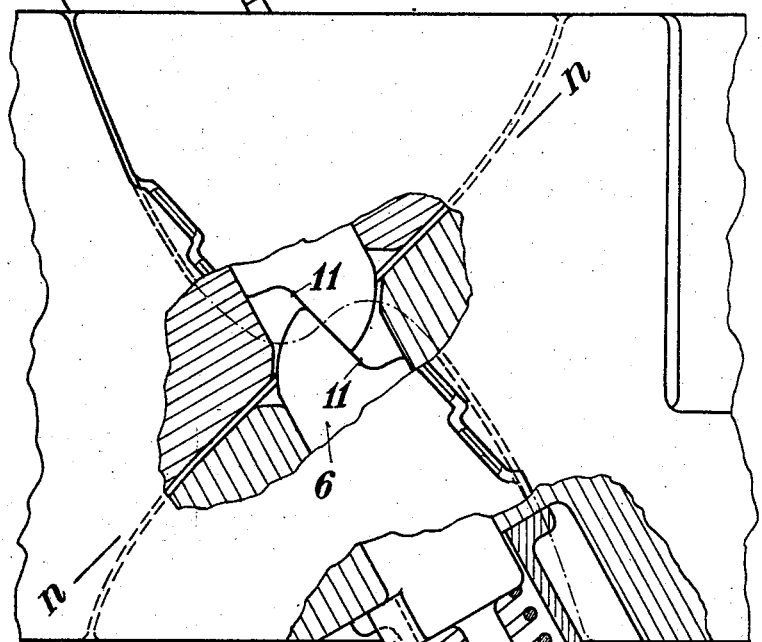
Figure 19:
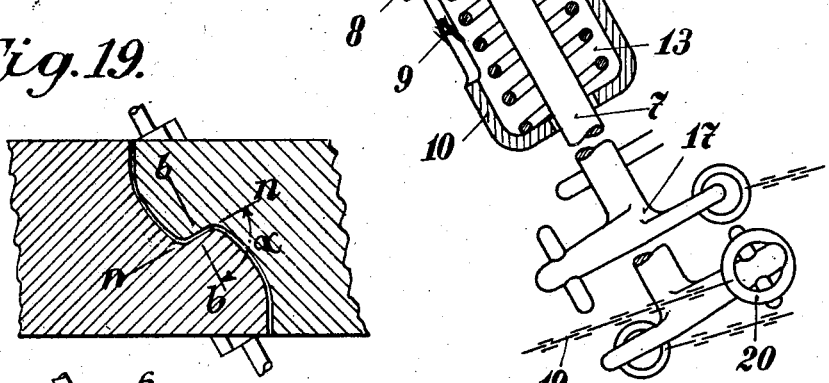
Figure 20:
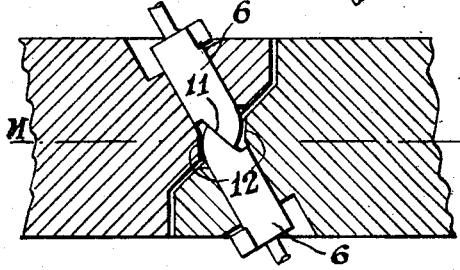

The accompanying drawings illustrate constructional examples of the coupling head, Fig. 1 being a front elevation,
Fig. 2 a side elevation,
Fig. 3 a plan view and
Fig. 4 a perspective view.
Figs. 5 to 8 show similar views of another constructional form,
Figs. 9 to 12 the arrangement of the coupling pin in a coupling head as shown in Figs. 5 to 8,
Figs. 13 to 16 a side view, a plan view, a front elevation and a perspective view of the coupling head,
Fig. 17 the coupling bolt,
Fig. 18 two coupling heads in engagement in plan and partly in section.
Fig. 19, a section along the line U—U of Figs. 15 and 16, and Fig. 20, a section along the line L—L of Figs. 15 and 16.

The surfaces 1 and 3, which extend from one side of the head to the other are inclined to the vertical central plane and are oppositely inclined, act as guides in the horizontal direction. Similarly the surfaces 2 and 4, which act as guides in the vertical direction, are also inclined to the horizontal central plane. By this means two diametrically opposite projections $V_o$ and $V_u$ are formed and two abutments $R_o$ and $R_u$. Owing to the strictly geometrical construction, in which the guiding surfaces intersect in lines passing through the longitudinal centre line of the head, the projections will rest accurately on the abutments, when the heads are interlocked, all the guiding surfaces lying right against one another and a snug engagement of the heads being effected. The greatest possible horizontal difference is equal to the width $a$ of the head and the greatest possible vertical difference equal to the height $b$ of the head.

In Figs. 5, 6, 7 and 8 each guiding surface is constituted by two parts (1, 1'; 2, 2'; 3, 3'; 4, 4') and between each of the said parts a flat surface 11, 12, 13, 14 is interposed, such that all the planes intersect in the centre line L—L of the head. This gives the advantage that the heads, when they come into engagement with each other, move only in the direction in which the train travels without any lateral or vertical displacement. This ensures the proper action of the coupling members (pins and the like) and makes it possible to mount the connections for the pipes and the like on the coupling heads without any danger.

Figure 9:
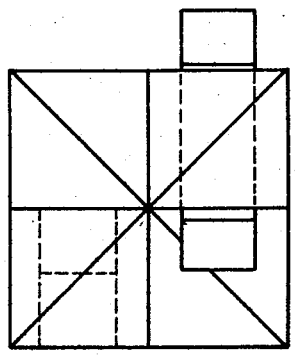
Figure 10:
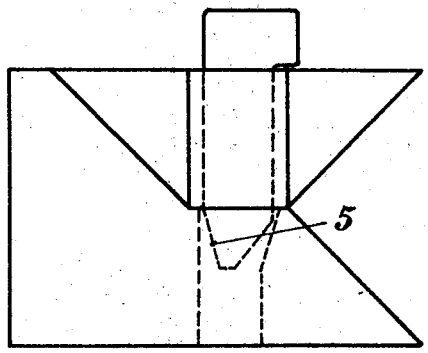
Figure 11:
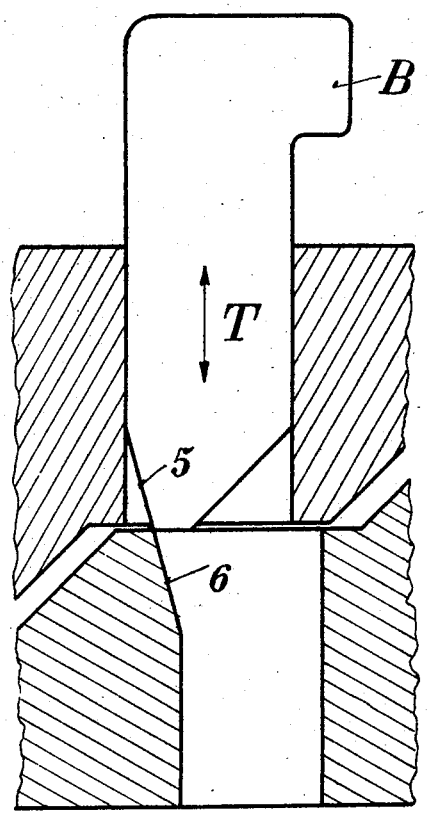
Figure 12:
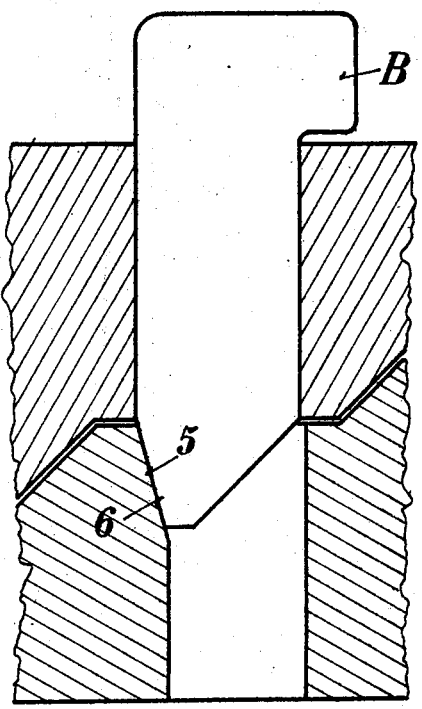
Figure 13:
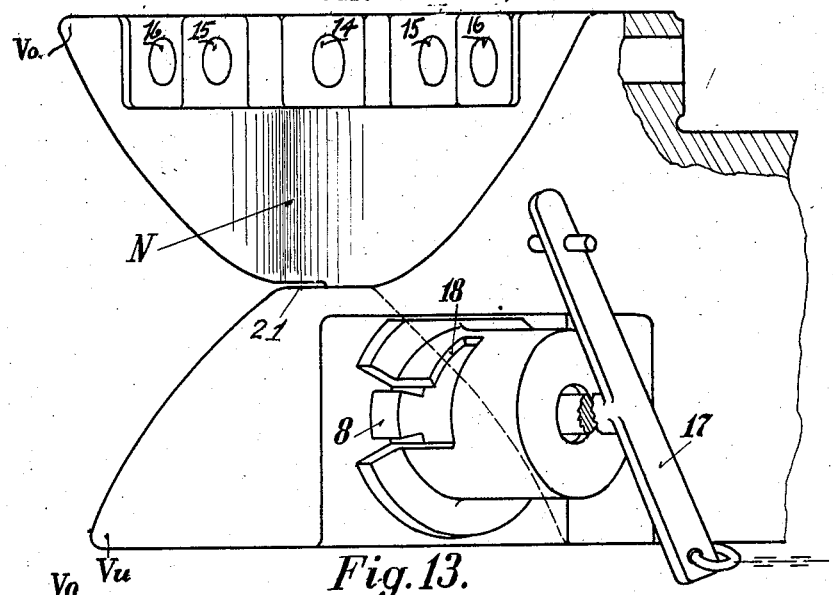
Figure 14:
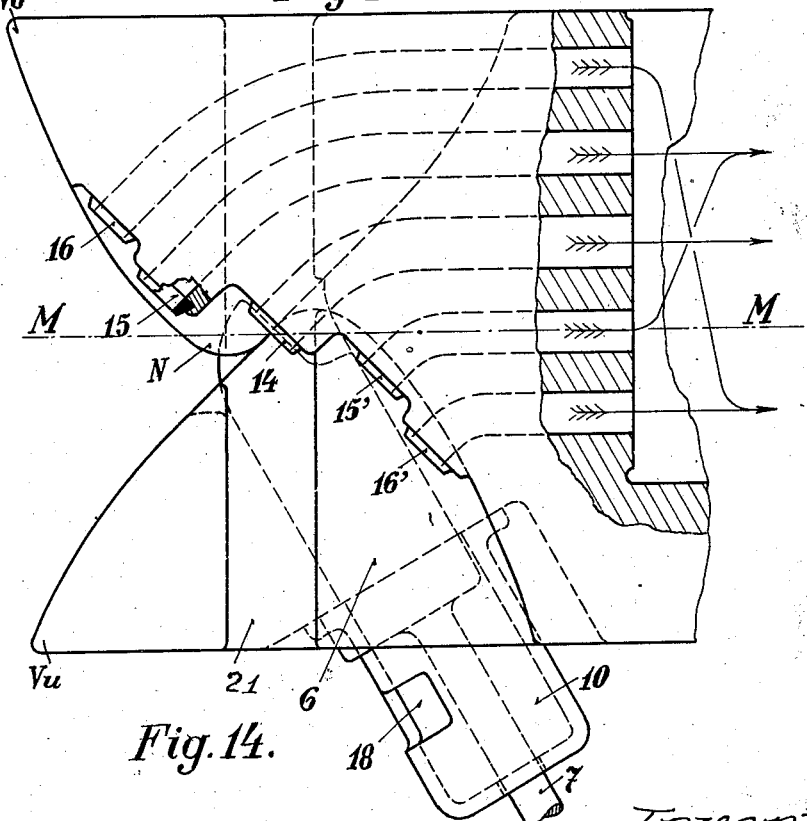
Figure 15:
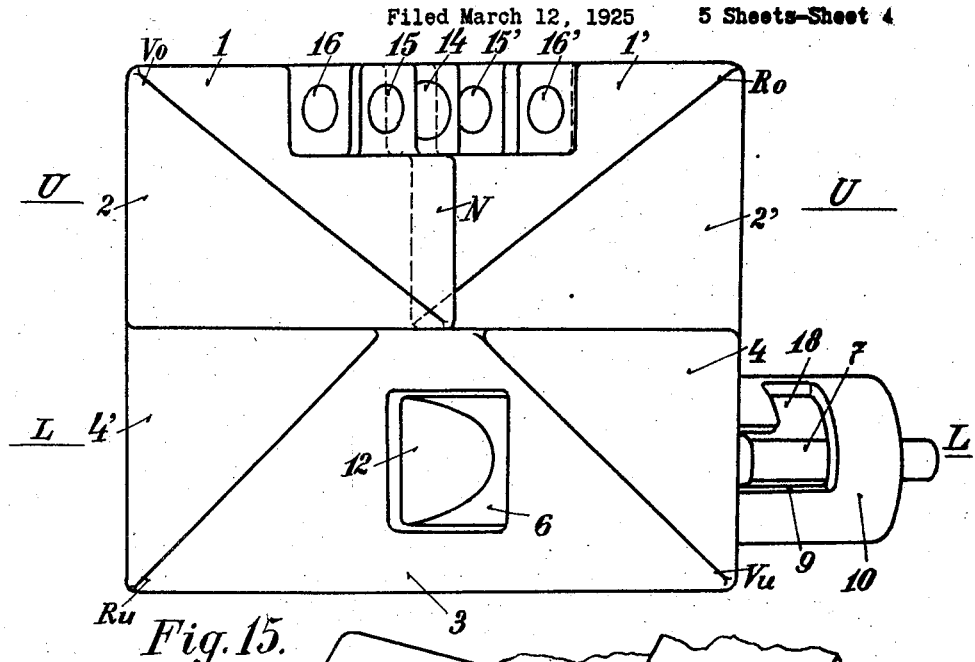
Figure 16:
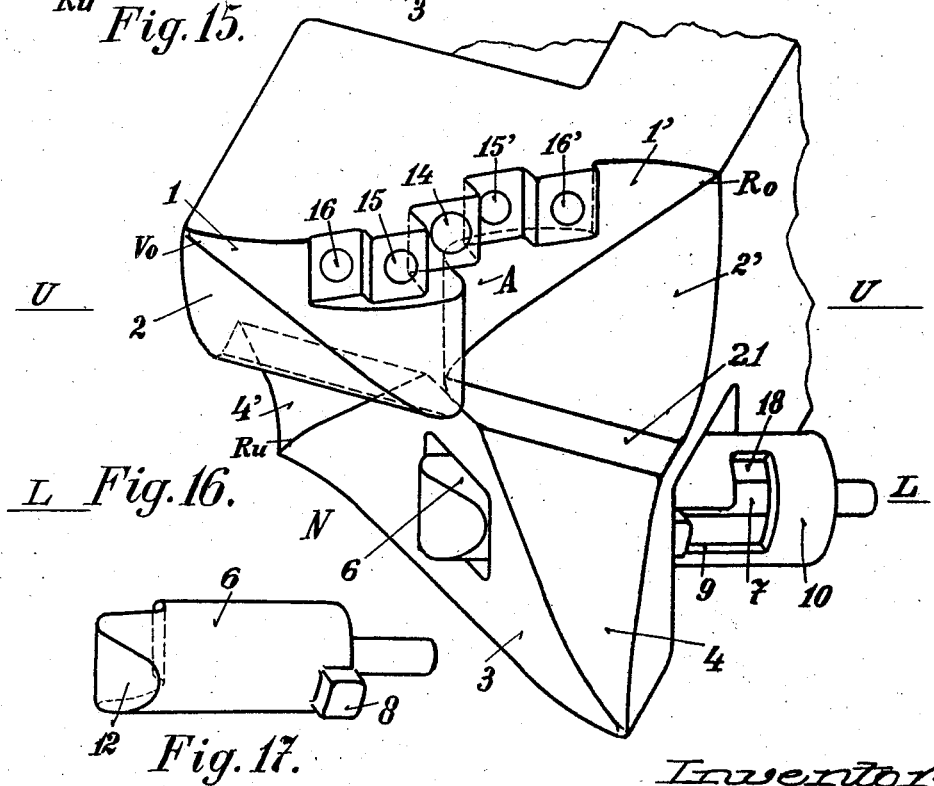

When pins are used for connecting the coupling heads, more particularly in conjunction with the form of head shown in Figs. 5, 6, 7, 8, a pin of the form shown in Figs. 9 to 12 will be preferably used. According to the invention the bearing surface 5 of the pin B and the abutment surface 6 are inclined to the direction of motion T of the pin. This arrangement together with the guiding surfaces 11—14 ensures a gradual closing and frictionless release of the parts, even when these are in tension. The pin commences its locking action even before the heads have got right home (Fig. 11) and sinks gradually till they are fully engaged (Fig. 12). From the closed position the pin may easily be raised, even when the parts are in tension, as owing to the inclined position of the surfaces 5 and 6 the latter separate without sliding on one another. Figs. 9 and 10 show the arrangement of the pin in a head of the kind shown in Figs. 5, 6, 7, 8.

This construction of pin with an inclined bearing surface provides the further advantage that the pin follows up automatically as it becomes worn, which ensures the absence of back lash.

The guiding surfaces 1—4 may be flat or curved.

In a modified form of the coupling according to the invention between a projection and a recess on the head, a projecting member is provided extending transversely through the vertical longitudinal middle plane of the head and a recess having the negative shape of the said projecting member for the reception of the projecting member of the other head.

Owing to this construction the coupling heads, when sliding into engagement with one another, are forced, besides the movement in the direction of pull, to perform a lateral movement relative to one another, on the projecting members sliding into their respective recesses. Similarly, on the coupling being uncoupled, the heads must perform the same lateral movement. The projecting members are so formed that two coupling heads, when in engagement with one another, would slide off from each other under the action of the pull, so that for establishing a connection which will withstand the pull it is necessary to provide separate locking means, which will prevent the lateral movement of the heads referred to above. Any suitable locking means may be used for this purpose.

In Figs. 13–20 the upper projection formed by the guiding surfaces 1 and 2 is marked $V_o$ and the lower projection formed by the guiding surfaces 3 and 4 is marked $V_u$. $R_o$ is the upper and $R_u$ the lower recess formed by the guiding surfaces 1' 2' and 3' 4' respectively. In the example shown the pair of surfaces 2 and 4' or 2' and 4 for overcoming the difference in height of the coupling heads is interrupted by a horizontal surface 21 and are thereby each divided into two partial surfaces 2 and 4' and 2' and 4 respectively. Instead of having a plane surface 21 the coupling head may have its said surfaces merging into one another gradually. In this constructional form as well the surfaces extend right from one side of the coupling to the other.

According to the present invention on one of the projecting parts, in the example shown on the upper one, the projecting member N is provided, which extends through the middle plane M—M. For forming this projecting member the middle part of the surface 1 has for instance the form of a sine curve (Fig. 14), the projecting member being so positioned that the middle plane M—M passes through the point of inflection of the sine curve. After the two heads have slid into engagement, the two projecting members will interlock, as shown in section in Fig. 19. In order to prevent the coupling from opening by the coupling heads sliding with respect to each other in the direction of the plane of the contact $n$—$n$, the coupling bolt 6 is provided in the head, the arrangement being such that, on the two heads sliding into engagement with each other, the bolts will slide one behind the other, the surface 11 of the bolt, which acts as the power transmitting surface, enclosing an angle with the surface $n$—$n$ of the projecting member, which serves the same purpose. Preferably the imaginary extensions of these surfaces will intersect in the middle plane M—M. In the constructional example shown the bolt 6 is in a guide, which is inclined to the middle plane and is provided with a shank 7 and, for locking it, with a stop member 8, which slides in the manner of a bayonet catch in a slot 9 of the casing 10. The outer end of the bolt is constantly loaded, for instance by a spring 14. The shank 7 is provided with the adjusting means required for adjusting the bolt.

The connections of the various pipes extending through the vehicles (for air, steam, electricity and the like) are arranged along the upper edge of the coupling head and are off-set with respect to each other (Figs. 12–16). Of the connections lying outside the longitudinal middle plane the abutting surfaces 15, 16 on the projecting part are set behind the guiding surface 1 and the abutting surfaces 15' and 16' in the recess are set in front of the guiding surface 1'. This arrangement has the object of preventing the packing rings coming in contact with the guiding surfaces of the other coupling head, on the heads sliding into engagement.

On two coupling heads coming in contact with each other eccentrically, the differences in height are equalized by the guiding surfaces 2, 4', 4 and 2' and the differences in the lateral direction by the guiding surfaces 1, 1' and 3. As the abutment surface 11 of the bolt 6 and the abutment surfaces $n$—$n$ of the projecting members are inclined in opposite directions with respect to the vertical middle plane of the coupling, no relative displacement of the heads can take place, when the parts are locked.

For releasing the coupling one of the bolts 6 is raised, until it releases the second bolt. Any suitable means can be used for this purpose. The example shown in the drawing is so constructed that it will meet all the demands made on it in ordinary working conditions and more particularly will prevent the unintentional coupling of vehicles, which have not been drawn apart and thus makes it possible for the head to be used simply as a buffer.

If the vehicles are pulled apart immediately after the bolt has been lifted, the bolt 6, after being withdrawn by the lever 17, will be returned into its position of rest by the spring 13, after which the coupling head is ready to be recoupled. If, on the other hand, the vehicles are not immediately drawn apart, the lever will be turned, after the withdrawal of the bolt, in such a manner that the stop member 8 of the bolt 6 will engage in the recess 18 and for returning the bolt into the position of rest automatically, on the vehicles being drawn apart, the lever 17 of one head is connected to the next vehicle, for instance by means of a chain 19 and a ring 20, such that, on the vehicles being drawn apart, the lever 17 will be so far displaced by the pull of the chain, that the spring 13 will return the bolt 6 into the position of rest, the lever 17 being swung back so far that, in the example shown, the connection is broken automatically by the ring sliding off.

Instead of the constructional form of head shown in the drawings, in which the projecting member N and the recess A are formed by a single surface, the generating line of which is similar to a sine curve, the head may be provided with any other suitable form of projecting member.

What I claim is:—

1. An automatic buffer coupling for railway vehicles comprising two coupling heads, each head formed by two diametrically opposite projections, each projection being constituted by two surfaces one surface extending through the whole breadth of the head and inclined to the vertical central longitudinal plane, the other surface extending through the whole height of the head and inclined to the horizontal central longitudinal plane so as to constitute horizontal and vertical guiding surfaces and two diametrically opposite recesses between said projections, having the negative form of the latter, the projections of one head being capable of fitting closely into the recesses of the other head, and coupling means for holding the heads in coupled relation as and for the purpose set forth.

2. An automatic buffer coupling for railway vehicles comprising two coupling heads, each head formed by two diametrically opposite projections, each projection being constituted by two surfaces one surface extending through the whole breadth of the head and inclined to the vertical central longitudinal plane, the other surface extending through the whole height of the head, and inclined to the horizontal central longitudinal plane so as to constitute horizontal and vertical guiding surfaces and two diametrically opposite recesses between said projections having the negative form of the latter, the projections of one head being capable of fitting closely into the recesses of the other head and the horizontal guiding surfaces intersecting in the vertical central plane of the head, and coupling means for holding the heads in coupled relation as set forth.

3. An automatic buffer coupling for railway vehicles comprising two heads, each head formed by two diametrically opposite projections, each projection being constituted by two surfaces, one surface extending through the whole breadth of the head and inclined to the vertical central longitudinal plane, the other surface extending through the whole height of the head and inclined to the horizontal central longitudinal plane so as to constitute horizontal and vertical guiding surfaces and two diametrically opposite recesses between said projections having the negative form of the latter, the projections of one head being capable of fitting closely into the recesses of the other head and the horizontal guiding surfaces intersecting in the vertical central plane of the head and flat axially directed portions in the said guiding surfaces for the purpose of positively guiding the coupling heads in the direction of their longitudinal centre line, and coupling means for holding the heads in coupled relation as and for the purpose set forth.

4. An automatic buffer coupling for railway vehicles comprising two coupling heads, each head formed by two diametrically opposite projections, each projection being constituted by two surfaces one surface extending through the whole breadth of the head and inclined to the vertical central longitudinal plane, the other surface extending through the whole height of the head and inclined to the horizontal central longitudinal plane so as to constitute horizontal and vertical guiding surfaces and two diametrically opposite recesses between the two projections having the negative form of the latter, the projections of one head being capable of fitting closely into the recesses of the other head and the horizontal guiding surfaces intersecting in the vertical central plane of the head and coupling pins for coupling the coupling heads the surface of the said pins for transmitting the tractive effort being inclined to the direction in which the pins are inserted, as and for the purpose set forth.

5. An automatic buffer coupling for railway vehicles comprising two coupling heads, each head formed by two diametrically opposite projections, each projection being constituted by two surfaces, one surface extending through the whole breadth of the head and inclined to the vertical central longitudinal plane, the other surface extending through the whole height of the head and inclined to the horizontal central longitudinal plane so as to constitute horizontal and vertical guiding surfaces, and two diametrically opposite recesses between said projections having the negative form of the latter the projections of one head being capable of fitting closely into the recesses of the other head, a projecting member on each head extending between a projection and a recess and passing through the vertical longitudinal central plane of the head and a recess having the negative shape of the said projecting member for the reception of the latter, and coupling means for holding the heads in coupled relation as set forth.

6. An automatic buffer coupling for railway vehicles comprising two coupling heads, each head formed by two diametrically opposite projections, each projection being constituted by two surfaces, one surface extending through the whole breadth of the head and inclined to the vertical central longitudinal plane, the other surface extending through the whole height of the head and inclined to the horizontal central longitudinal plane so as to constitute horizontal and vertical guiding surfaces and two diametrically opposite recesses between said projections having the negative form of the latter, the projections of one head being capable of fitting closely into the recesses of the other head and a coupling pin in each coupling head, the surface of the said pins for transmitting the tractive effort being inclined to the direction in which the pins are inserted, a projecting member on each head extending between a projection and a recess and passing through the vertical longitudinal central plane of the head and a recess having the negative shape of the said projecting member for the reception of the latter.

7. An automatic buffer coupling for railway vehicles comprising two coupling heads, each head formed by two diametrically opposite projections, each projection being constituted by two surfaces, one surface extending through the whole breadth of the head and inclined to the vertical central longitudinal plane, the other surface extending through the whole height of the head and inclined to the horizontal central longitudinal plane so as to constitute horizontal and vertical guiding surfaces and two diametrically opposite recesses between said projections having the negative form of the latter, the projections of one head being capable of fitting closely into the recesses of the other head and a coupling pin in each coupling head, the relative position of the pins being such that, when the two coupling heads are in engagement with one another, each pin forms an abutment for the other, as and for the purpose set forth.

8. An automatic buffer coupling for railway vehicles, comprising two coupling heads, each head formed by two diametrically opposite projections, each projection being constituted by two guiding-surfaces, one surface extending through the whole breadth of the head and inclined to the vertical central longitudinal plane, the other surface extending through the whole height of the head and inclined to the horizontal central longitudinal plane, two diametrically opposite recesses between the said projections, having the negative form of the latter, the projections of one head being capable of fitting closely into the recesses of the other head, and passages arranged in the said coupling heads and capable of registering with each other when the coupling heads are in engagement with each other, the registering outlets of the said passages in the projection lying behind the guiding surface and the registering outlets of the passages in the recess lying in front of the guiding surface, and coupling means for holding the heads in coupled relation as and for the purpose set forth.

In testimony whereof I have signed my name to this specification.

LÁSZLÓ KÜRTÖSSY.